(12) United States Patent
Lindqvist

(10) Patent No.: US 9,241,320 B2
(45) Date of Patent: Jan. 19, 2016

(54) BASE STATION SYNCHRONIZATION

(75) Inventor: Dan Lindqvist, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1038 days.

(21) Appl. No.: 13/097,650

(22) Filed: Apr. 29, 2011

(65) Prior Publication Data

US 2012/0275554 A1 Nov. 1, 2012

(30) Foreign Application Priority Data

Apr. 26, 2011 (SE) .................. PCT/SE2011/050496

(51) Int. Cl.
*H04L 7/00* (2006.01)
*H04W 56/00* (2009.01)
*H04J 3/06* (2006.01)

(52) U.S. Cl.
CPC ......... *H04W 56/0035* (2013.01); *H04J 3/0661* (2013.01)

(58) Field of Classification Search
USPC ................................. 375/316, 354
See application file for complete search history.

(56) References Cited

U.S. PATENT DOCUMENTS

| 4,672,447 | A | * | 6/1987 | Moring et al. | 348/537 |
| 5,861,842 | A | * | 1/1999 | Hitch et al. | 342/357.31 |
| 5,950,115 | A | * | 9/1999 | Momtaz et al. | 455/73 |
| 2005/0041692 | A1 | | 2/2005 | Kallstenius | |
| 2005/0104666 | A1 | * | 5/2005 | Rebel | 331/2 |
| 2007/0081514 | A1 | | 4/2007 | Shirokura et al. | |
| 2008/0085721 | A1 | | 4/2008 | Hirano et al. | |
| 2012/0256789 | A1 | * | 10/2012 | Bull et al. | G01S 5/0221 342/357.25 |
| 2013/0135447 | A1 | * | 5/2013 | Kim | H04N 13/0296 348/49 |

FOREIGN PATENT DOCUMENTS

| EP | 1821430 A2 | 8/2007 |
| JP | 2001251665 A | 9/2001 |
| JP | 2007228327 A | 9/2007 |
| JP | 2011069717 A | 4/2011 |
| JP | 2011082830 A | 4/2011 |
| WO | 2006001074 A1 | 1/2006 |
| WO | 2008025978 A1 | 3/2008 |

* cited by examiner

*Primary Examiner* — Shuwang Liu
*Assistant Examiner* — Gina Mckie
(74) *Attorney, Agent, or Firm* — Coats & Bennett, P.L.L.C.

(57) ABSTRACT

The invention relates to transmission and reception of clock synchronization data in a wireless communication system. According to the invention a device for transmitting clock synchronization data obtains at least one time reference of a wireless communication system clock, controls transmission of a frequency reference of the wireless communication system clock via an air interface of the wireless communication system, and provides transmission of the time reference via a transport network associated with the wireless communication system, while the base station receives the frequency reference, locks an own oscillator to the frequency of the frequency reference, receives the time reference from the transport network and adjusts timing that is controlled by the oscillator based on the time reference.

16 Claims, 3 Drawing Sheets

BASE STATION SYNCHRONIZATION

RELATED APPLICATION

This application claims priority to International Patent App. No. PCT/SE2011/050496, which was filed Apr. 26, 2011 and is incorporated herein by reference in its entirety.

TECHNICAL FIELD

The invention relates generally to wireless communication systems. More particularly, the invention relates to a method, device and computer program product for transmitting clock synchronization data to a base station of a wireless communication system as well as to a method in a base station for receiving clock synchronization data from a clock synchronization device of a wireless communication system as well as a base station of a wireless communication system.

BACKGROUND

The size of wireless communication systems in terms of the number of nodes they include have increased rapidly in recent years. One type of communication system where this trend is especially strong is the cellular system.

One reason for this growth is the reduction in size of some system nodes, such as base stations. Base stations can nowadays be fairly small and cover a small area. This allows great flexibility in the systems but also puts high demands on them.

As the size of the base stations decrease there is desire to make them as simple as possible in order to keep the costs down. However, they must still have a first-rate functionality.

One area where this is evident is the issue of clocks and timing.

A base station used in a wireless communication system needs a stable frequency reference to be able to communicate with mobile stations at a reasonable bitrate. Demand for higher bitrates is increasing over time, depending of new end user features that requires large amount of data to be transferred to and from the mobile stations.

This leads to the requirement of more bandwidth and higher frequencies, which emphasises the need for exact timing.

This exact timing can in many instances be obtained using an oscillator that is heated and kept at a specific temperature with the help of a temperature regulation device, such as an Oven.

Yet another solution is to use a Global Positioning System (GPS) receiver for time and frequency synchronization of the local oscillator.

The use of GPS is for instance described in U.S. Pat. No. 7,606,541.

Stable oscillators are costly and require volume/space in the device. Warming the oscillator will first of all require the additional arrangement needed for keeping a certain temperature, which adds to the cost and the complexity. However, it will also draw extra energy, which even further raises the costs. The time until a stable frequency can be generated is further rather long depending of time sample integrating and oscillator warming, which means that valuable time may be lost before the required accuracy is obtained.

When synchronization is solved with the help of a GPS, the obvious drawback is that the GPS signal is not always available, typically not in indoor systems. Furthermore, there is here a requirement of additional receivers for receiving GPS signals.

As can be seen, there is therefore a need for alternative ways of obtaining accurate timing of a base station.

SUMMARY

The invention is therefore directed towards providing an alternative way of obtaining accurate timing of a base station.

One object of the invention is thus to provide an alternative way of obtaining accurate timing of a base station.

This object is according to a first aspect of the invention achieved through a method for transmitting clock synchronization data to a base station of a wireless communication system. The method comprises:

obtaining at least one time reference of a wireless communication system clock, transmitting a frequency reference of the wireless communication system clock via an air interface of the wireless communication system, and transmitting the at least one time reference via a transport network associated with the wireless communication system.

The object is according to a second aspect of the invention achieved through a device for transmitting clock synchronization data to a base station of a wireless communication system. This device comprises:

a time reference obtaining unit for obtaining at least one time reference of a wireless communication system clock, and a transmission control unit configured to control transmission of a frequency reference of the wireless communication system clock via an air interface of the wireless communication system, and provide transmission of the at least one time reference via a transport network associated with the wireless communication system.

The above-mentioned object is according to a third aspect of the invention achieved through a computer program product for transmitting clock synchronization data to a base station of a wireless communication system, the computer program product comprising a computer readable storage medium comprising a set of instructions causing a synchronization handling module of a clock synchronization device to:

obtain at least one time reference of a wireless communication system clock, control transmission of a frequency reference of the wireless communication system clock via an air interface of the wireless communication system, and provide transmission of the at least one time reference via a transport network associated with the wireless communication system.

In one variation of the invention, the method may further comprise obtaining the frequency reference of the wireless communication system clock and the device may comprise a frequency reference obtaining unit for obtaining the frequency reference of the wireless communication system clock.

In another variation of the invention, more than one time reference is transmitted.

In yet another variation of the invention the frequency reference is transmitted using a wireless communication interface of the wireless communication system. For this purpose the transmission control unit of the device may be connected to a wireless communication interface of the wireless communication system and configured to control it to transmit the frequency reference.

The above-mentioned object is according to a fourth aspect of the invention achieved through a method in a base station for receiving clock synchronization data from a clock synchronization device of a wireless communication system. The method comprises:

receiving a frequency reference via an antenna of the base station, locking an oscillator to the frequency of the frequency reference, receiving at least one time reference via a transport network associated with the wireless communication system, and adjusting timing controlled by the oscillator based on the time reference.

The object is according to a fifth aspect of the invention achieved through a base station of a wireless communication system. This base station comprises:

at least one antenna, a reference signal receiver, an oscillator, a time counter operated by the oscillator, an oscillator locking unit configured to receive a frequency reference from the antenna via the reference signal receiver and to lock said oscillator to the frequency of the frequency reference, a timing adjusting unit configured to receive at least one time reference from a transport network associated with the wireless communication system and to adjust the timing of the time counter based on the time reference.

In a further variation of the invention the latter method comprises estimating the delay of the time reference through the transport network and adjusting the timing also based on the estimated delay. In this same aspect the timing adjusting unit of the base station is further configured to estimate the delay of the time reference through the transport network and adjust the timing also based on the estimated delay.

The delay may be estimated based on the time of reception of at least one previously received time reference.

The estimating performed in the method may also comprise averaging the delay of a number of time references, where the estimated delay used in the adjusting of the timing is the averaged time delay. This means that the timing adjusting unit of the base station may be further configured to average the delay of a number of time references, where the estimated delay used in the adjusting of the timing is the averaged time delay.

The frequency reference may finally be provided via a carrier having a frequency below 400 MHz.

The invention has many advantages. Through the invention it is possible to obtain both time and frequency stability using a less precise oscillator. This allows a simpler, smaller and more economical base station design. The local base station oscillator does thus not have to have long term stable properties and can therefore be low cost. As no special heating arrangement is required the energy consumption is furthermore low.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns the handling of synchronization of base station oscillators in a wireless communication system.

Figure 1:
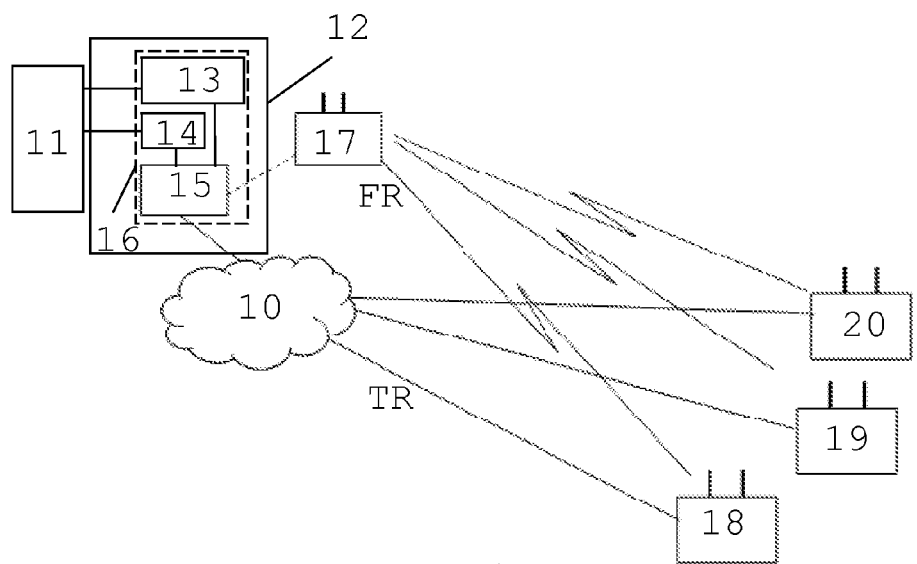
FIG. 1 schematically shows a wireless communication system comprising a system clock connected to a synchronization handling device as well as a number of base stations communicating with the synchronization handling device via a transport network as well as via a further wireless interface.

One such wireless communication system is schematically shown in FIG. 1.

The wireless communication system may here be a cellular or mobile communication system such as Long-Term Evolution (LTE), Universal Mobile Telecommunications System (UMTS) or Global System for Mobile Communications (GSM). As one variation the system may be a Time Division Duplex (TDD) system. These are just a few examples of systems where the invention can be implemented and it should be realized that the invention can just as well be implemented in other types of systems such as systems based on Wireless Local Area Networks (WLANs).

The exemplifying wireless communication system 10 comprises a number of base stations, where a first base station 18 is a base station having an oscillator that is to be synchronised according to the principles of the invention. There is here furthermore a second and a third base station 19 and 20, where the second and third base stations 19 and 20 may or may not be of the same type as the first base station 18, i.e. performing the synchronization according to the invention.

In the wireless communication system there is furthermore a central time source or wireless communication system clock 11, which may be an atomic clock keeping a very precise time. To this central time source 11 there is connected a device 12 for transmitting clock synchronization data. This device will in the following be referred to as a clock synchronization device 12. The clock synchronization device 12 comprises a synchronization handling module 16, which module in turn comprises a number of units. There is here a frequency obtaining unit 13, a time reference obtaining unit 14 and a transmission control unit 15. Here both the time reference obtaining unit 14 and frequency reference obtaining unit 13 are connected to the central clock 11 as well as to the transmission control unit 15. The transmissions control unit 15 is in turn connected to a transport network 10 as well as to a wireless interface 17 associated with the wireless communication system. This wireless interface is in this example another base station also communicating with mobile stations. It should here be realized that the wireless interface may be another type of interface, such as a separate radio transmitter to which the clock synchronization device 12 may have sole access. It may thus be a transmitter that does not concern itself with regular wireless communication to mobile stations.

The transport network 10 is here a transport network associated with the wireless communication system. This means that it may be a part of the wireless communication system. As an alternative it may be a transport network to which devices of the wireless communication system have access. As another alternative this network may be shared with other systems. The transport network 10 may here be a packet based data communication network, for instance a Transmission Control Protocol/Internet Protocol (TCP/IP) network.

Figure 2:
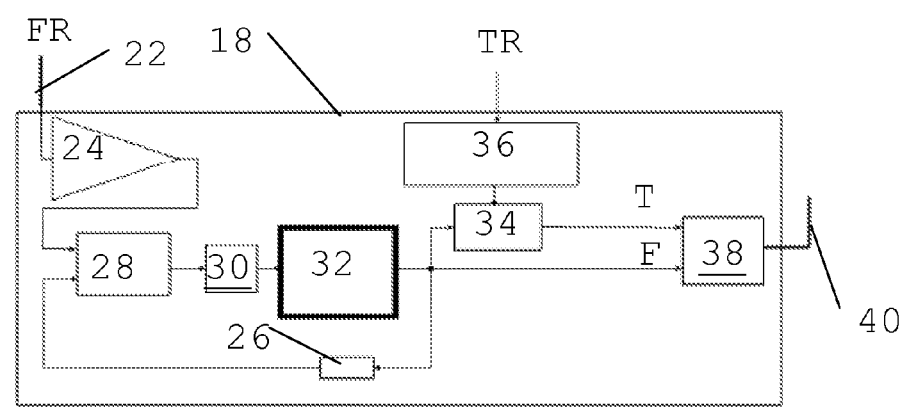
FIG. 2 shows a block schematic of one variation of a base station.

FIG. 2 shows a block schematic of the first base station 18. This base station 18 includes a first antenna 22 connected to a reference signal receiver 24, which receiver 24 is in turn connected to an oscillator locking unit 28. The oscillator locking unit 28 is in turn connected to an oscillator 32 via a filter 30. The oscillator 32 provides a frequency which is sent to a scaling unit 26 as well as to a time counter 34 and to a radio circuit 38. The scaling unit 26 is connected to the oscillator locking unit 28 and the time counter 34 is also connected to the radio circuit 38, which radio circuit is connected to a second antenna 40. The time counter 34 is here furthermore connected to a timing adjusting unit 36 which is provided with an interface (not shown) to the transport network.

As mentioned above there is in wireless communication systems a trend towards increased bit rates, higher frequencies and smaller base stations, which puts harder requirements on the time keeping ability of the time keeping units provided in such base stations, which time keeping units may be oscillators, time counters and clocks. This is combined with a need to keep the base stations as small and inexpensive as possible, such as for instance in order to provide pico or even femto base stations that may be placed indoors.

This means that it is necessary to use oscillators in the base stations that are cheap and as a consequence less exact. However, they should still be able to keep an exact time.

One or more embodiments herein employ a standard packed-based data communication network for transmitting a time reference, while employing a wireless interface for transmitting a frequency reference. The embodiments thus transmit a stable frequency reference over the air, which wireless nodes can use as a frequency reference, while time synchronization data is transmitted over a packet-based data communication network.

Figure 3:
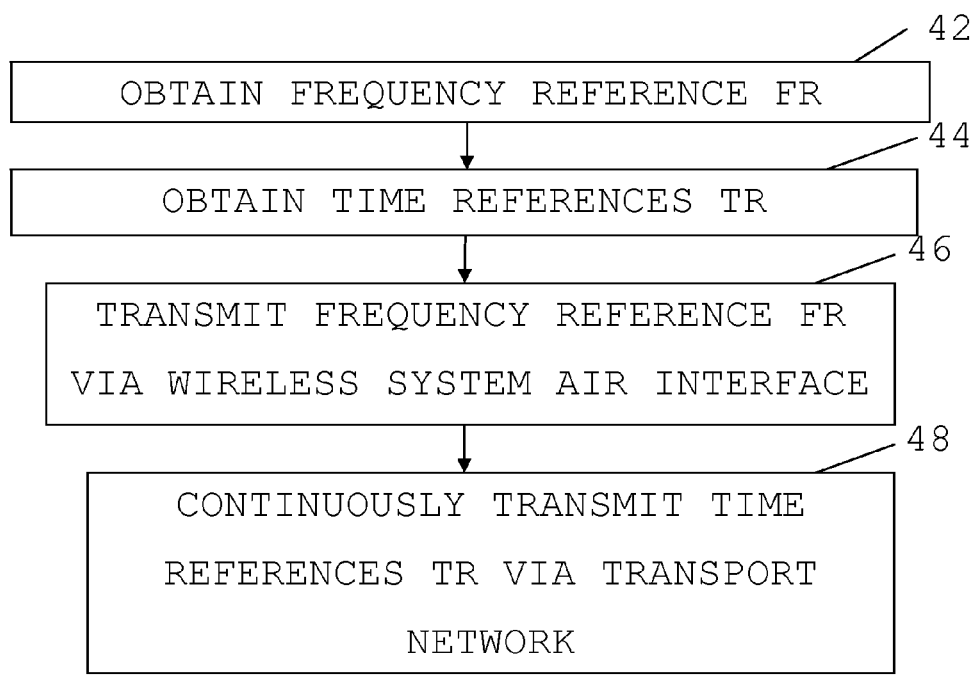
FIG. 3 shows a flow chart of a method for transmitting clock synchronization data being performed in the synchronization handling device.
Figure 4:
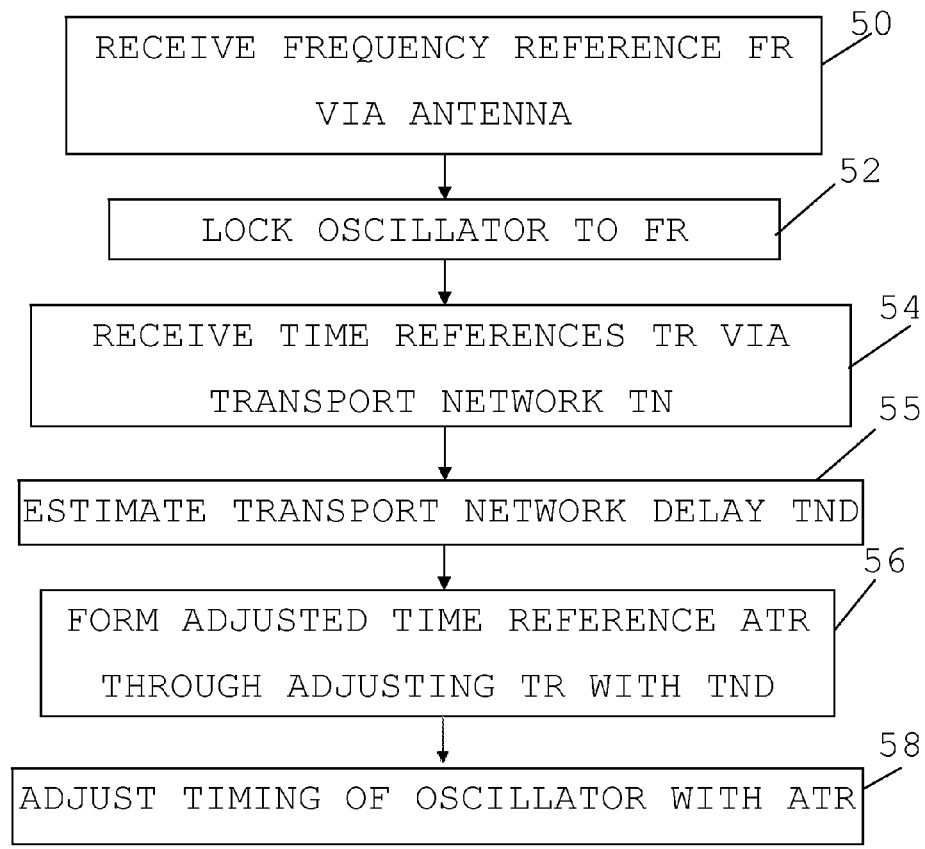
FIG. 4 shows a flow chart of the method for receiving clock synchronization data being performed in the base station, and FIG. 5 schematically shows a computer program product comprising computer program code with instructions performing the functionality of the synchronization handling device.

The functioning of the system will now be described in some more detail with reference also being made to FIG. 3, which shows a flow chart of a method for transmitting clock synchronization data being performed in the synchronization handling device, and to FIG. 4, which shows a flow chart of a method for receiving clock synchronization data being performed in the first base station.

The clock synchronization device 12 is provided for synchronization base stations in the wireless communication system and consequently for synchronizing the first base station 18. In order to do this the frequency reference obtaining unit 13 is connected to the wireless communication system clock 11 and obtains a frequency reference, step 42, which may be the frequency used by the system clock 11. It may also be a scaled version of this frequency, either scaled up or scaled down. The time reference obtaining unit 14 also connects to the system clock 11 and obtains a time reference, step 44. These references are then provided to the transmission control unit 15. The transmission control unit 15 in turn connects to or is already connected to the wireless interface 17 associated with the wireless communication system, which in this embodiment is the associated base station. The frequency reference obtaining unit 13 and transmission control unit 15 may here makes sure that the wireless interface then wirelessly transmits the frequency reference FR to the devices of the system via the wireless system air interface, step 46. This transmission may here be a continuous transmission of the frequency referenced FR. The transmission control unit 15 may here provide a communication link between the frequency reference obtaining unit 13 and the associated wireless interface 17 via which an oscillator of the wireless interface is tuned to the frequency or a scaled version of the frequency of the system clock. The frequency obtaining unit may thus control the associated wireless interface to transmit the frequency reference FR. The wireless interface may also be employing an extremely stable oscillator. The frequency used may here be a carrier or a subcarrier. The frequency used is selected such that it easily penetrates obstacles like walls etc. and may be much lower than the frequency used by ordinary radio base station systems. In one exemplifying variation of the invention the carrier may be a carrier having a frequency below 400 MHz. It may as a further example be a Longwave carrier that may be in the range 40-200 kHz. It should however be realized that the invention is not limited to these frequencies but other may be used, for instance GSM frequencies. From this it can thus be gathered that the wireless interface 17 may be set to transmit the frequency reference.

The transmission control unit 15 also connects to the transport network 10 and transmits the one or more time references TR via the transport network 10. These may be transmitted as User Datagram Protocol (UDP) or TCP packets. The time references TR may furthermore be provided as time stamped data packets, which means that the time reference obtaining unit 14 may be a time stamping unit that puts a time stamp of the system clock 11 to data packets being sent by the transmission control unit 15 via the transport network 10.

In the first base station 18, the frequency reference FR is received by the reference signal receiver 24 via the first antenna 22, step 50, and forwarded to the frequency locking unit 28. The frequency locking unit 28, which may be a phase detector, also receives the frequency of the oscillator 32, which may be scaled up or down by the scaling unit 26 in case the frequency reference and oscillator frequency differ. The phase detector 28 then detects the difference in phase between these frequencies and provides a control signal based on the difference, which is filtered by the filter 30. This control signal has the function of adjusting the oscillator frequency to the frequency of the frequency reference FR. In this way the oscillator frequency is locked to the frequency reference by the oscillator locking unit 28, step 52. This adjusted frequency is then used for operating the radio communication unit 38 as well as for operating the time counter 34, which is also a local clock.

Even though the frequency is adjusted in this way, which leads to the local clock not having any time drift, the time may still be offset from the correct time. In order to address this, the timing adjusting unit 36 receives the one or more time references TR via the transport network 10, step 54. The one or more time references are then used for adjusting the timing of the time counter 34 that is controlled by the oscillator 32. In this way the timing controlled by the oscillator 32 is adjusted based on the received time reference TR, step 58.

It takes time for packets to pass through the transport network 10 and this time is furthermore different between the various network nodes. The time may also differ between packets intended for the same node. This means that the time stamp of a packet will reflect a time in the past rather then the current time. This also means that it may be necessary to determine the delay through the network, which delay determination may be based on the difference between the time of arrival of a packet and the time stamp it has. This may furthermore be done through averaging a number of such differences and apply the averaged value to a received time reference and more particularly to apply the averaged times to the time stamp of a received packet. The estimation of transport network delay may more particularly be performed using Precision Time Protocol (PTP) as described in the IEEE standard IEEE 1588. Therefore the timing adjusting unit 36 may estimate the transport network delay TND, step 55, and form an adjusted time reference ATR through adjusting the time reference TR with the transport network delay TND, step 56. This adjusted time reference ATR may then be used by the timing adjusting unit 36 for adjusting the timing of the time counter 34 and therefore for adjusting the timing of the oscillator.

As can be seen a central reference transmitter may send a continuous reference signal to all nodes in the wireless communication system, where one, several or all nodes here comprise a receiver that detects the reference signal and locks its local oscillator. The synchronization using the transport network, often denoted IP-Sync, is then only used to synchronize the time, while frequency stability is assured by the reference signal from the wireless interface 17, which thus is a reference frequency transmitter.

In this way it is possible to obtain both time and frequency stability using a less precise oscillator. This allows a simpler, smaller and more economical design of the base station. The local base station Oscillator does thus not have to have long term stable properties and can therefore be low cost. The correct timing is furthermore obtained fast as compared with stable oscillators. As no special heating arrangement is required the energy consumption is furthermore low.

There are several advantages with using a low reference frequency, such as an LW frequency. This ensures that that the ordinary communication in the wireless communication system is not interfered by the frequency reference. Another advantage is that the low frequency signals more easily propagate through walls and windows. This means that it is possible to obtain the frequency reference also when a base station is placed indoors in a building, and it may even be placed in a basement.

The reference signal can be an un-modulated carrier, a carrier modulated with a single tone or even several tones. It is also possible to provide counter values that can be used for initial, rough, time synchronization (un-compensated for air time travel delays).

In the embodiment described above there was a separate antenna and reference signal receiver. It should here be realized that as an alternative it is possible to use the regular radio receiver 38 and antenna 40 also for this purpose.

In the system described above there was only one wireless interface used to transfer the frequency reference. It should be realized that a frequency reference could be transferred using several different wireless interfaces in order to be able to reach all the nodes of the wireless communication system.

This also means that a base station may be able to receive the frequency reference from several sources. These sources may furthermore use different frequencies. The base station may then select one of the sources, for instance the one from which it has the best reception of frequency reference. It may then inform the clock synchronization about the selected frequency reference. The clock synchronization device may then inform the base station about a scaling factor to be used to obtain the correct frequency with which to adjust the local oscillator.

It should also be realized that it is possible to omit the filter from the base station as well as to omit the scaling unit. It is also possible to add another scaling unit between reference signal receiver and oscillator locking unit. The wireless interface used by the clock synchronization device may alternatively be provided with an own stable oscillator, in which case the frequency obtaining unit may be omitted.

The timing adjusting unit of the first base station and the synchronization handling module of the clock synchronization device may with advantage be provided in the form of a processor with associated program memory including computer program code for performing its functionality. It should be realized that they may also be provided in the form of hardware, like for instance in the form of Application Specific Integrated Circuits (ASIC) or Digital Signal Processors (DSP). The computer program code may also be provided as a set of computer program code instructions on a computer-readable storage medium, for instance in the form of a data carrier, like a CD ROM disc or a memory stick, which will implement the function of the above-described timing adjusting unit and synchronization handling module when being loaded into the above-mentioned program memory and run by the processor.

Figure 5:
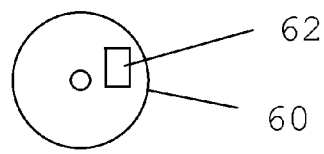

One such computer readable storage medium in the form of a CD ROM disc 60 with computer program code 62 is schematically shown in FIG. 5.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method in a base station for receiving clock synchronization data from a clock synchronization device of a wireless communication system, comprising:
   receiving a frequency reference using an antenna and a reference signal receiver of the base station that are separate and distinct from an antenna and a radio receiver used by the base station for regular wireless communication with mobile stations in the wireless communication system,
   locking an oscillator to the frequency of the frequency reference,
   receiving at least one time reference via a transport network associated with the wireless communication system, and
   adjusting timing controlled by the oscillator based on the at least one time reference.

2. The method according to claim 1, further comprising estimating the delay of the time reference through the transport network and adjusting the timing also based on the estimated delay.

3. The method according to claim 2, wherein the delay is estimated based on the time of reception of at least one previously received time reference.

4. The method according to claim 2, further comprising averaging the delay of a number of time references, wherein the estimated delay used in the adjusting of the timing is the averaged time delay.

5. The method according to claim 1, wherein the frequency reference is received via a carrier having a frequency below 400 MHZ.

6. The method according to claim 1, wherein the base station is a terrestrial base station and the wireless communication system is a terrestrial wireless communication system.

7. The method according to claim 1, wherein the wireless communication system is a cellular communication system and wherein said base station provides coverage for one or more cells of said cellular communication system.

8. The method according to claim 1, wherein the wireless communication system comprises a Wireless Local Area Network (WLAN).

9. The method according to claim 1, wherein the transport network is a packet-based data communication network.

10. The method according to claim 9, wherein the time reference is a time stamped data packet.

11. A base station of a wireless communication system, comprising:
- an antenna and a radio receiver used by the base station for regular wireless communication with mobile stations in the wireless communication system;
- at least one antenna and a reference signal receiver that are separate and distinct from the antenna and radio receiver used by the base station for said regular wireless communication with mobile stations,
- an oscillator,
- a time counter circuit operated by the oscillator,
- an oscillator locking circuit configured to receive a frequency reference from said at least one antenna via said reference signal receiver and to lock said oscillator to the frequency of the frequency reference,
- a timing adjusting circuit configured to receive at least one time reference from a transport network associated with the wireless communication system and to adjust the timing of the time counter based on the time reference.

12. The base station according to claim 11, wherein the timing adjusting circuit is further configured to estimate the delay of the time reference through the transport network and adjust the timing also based on the estimated delay.

13. The base station according to claim 12, wherein the timing adjusting circuit is further configured to average the delay of a number of time references, wherein the estimated delay used in the adjusting of the timing is the averaged time delay.

14. The base station of claim 11, wherein the wireless communication system comprises a Wireless Local Area Network (WLAN).

15. The base station of claim 11, wherein the transport network is a packet-based data communication network.

16. The base station of claim 15, wherein the time reference is a time stamped data packet.

* * * * *